United States Patent
Bell et al.

(10) Patent No.: US 7,487,017 B1
(45) Date of Patent: Feb. 3, 2009

(54) SYSTEMS AND METHODS FOR GENERATING PATTERN KEYS FOR USE IN NAVIGATION SYSTEMS TO PREDICT USER DESTINATIONS

(75) Inventors: David Bell, Hampshire (GB); Chris Bygrave, Hampshire (GB); Oliver Dineen, Hampshire (GB); Philip Norton, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/059,465

(22) Filed: Mar. 31, 2008

(51) Int. Cl.
*G01C 21/34* (2006.01)

(52) U.S. Cl. .................... 701/27; 342/357.08

(58) Field of Classification Search ............. 701/23–27, 701/208–210, 213–214, 200–202; 342/357.01, 342/357.1, 357.08; 340/988
See application file for complete search history.

(56) References Cited

U.S. PATENT DOCUMENTS

| | | | |
|---|---|---|---|
| 5,919,246 A | 7/1999 | Waizmann et al. | |
| 6,591,188 B1 | 7/2003 | Ohler | |
| 6,941,222 B2 | 9/2005 | Yano et al. | |
| 6,961,658 B2 | 11/2005 | Ohler | |
| 7,092,818 B2 | 8/2006 | Ohler | |
| 7,197,394 B2 | 3/2007 | Ohler | |
| 7,203,598 B1 | 4/2007 | Whitsell | |
| 7,233,861 B2 | 6/2007 | Van Buer et al. | |
| 7,395,153 B1* | 7/2008 | Nesbitt et al. | 701/210 |
| 2005/0125148 A1* | 6/2005 | Van Buer et al. | 701/209 |
| 2006/0173841 A1 | 8/2006 | Bill | |
| 2007/0010942 A1 | 1/2007 | Bill | |
| 2007/0073477 A1* | 3/2007 | Krumm et al. | 701/209 |
| 2008/0027639 A1 | 1/2008 | Tryon | |

FOREIGN PATENT DOCUMENTS

| | | |
|---|---|---|
| CN | 1752717 | 3/2006 |
| JP | 2005283575 | 10/2005 |
| JP | 2006284254 | 10/2006 |
| WO | WO2006023191 | 3/2006 |

OTHER PUBLICATIONS

John Krumm. Real Time Destination Prediction Based on Efficient Routes. Paper No. 2006-01-0811. Microsoft Research. SAE International.

Lawrence Cavedon Hua Cheng, Robert Dale, Generating Navigation Information Based on the Driver's Route Knowledge. Coling Geneva 2004: 20th International Conference on Computational Linguistics (Aug. 28 and 29, 2004); Robust and Adaptive Information Processing for Mobile Speech Interfaces (DUMAS Final Workshop). pp. 31-38. http://acl.ldc.upenn.edu/coling2004/SE1/index.html.

* cited by examiner

*Primary Examiner*—Dalena Tran
(74) *Attorney, Agent, or Firm*—Keusey, Tutunjian & Bitetto, P.C.

(57) ABSTRACT

Systems and methods for automatically generating pattern keys based on models of user travel patterns and behavior, wherein the pattern keys may be used in automated navigation systems for fast and efficient prediction of user destinations.

1 Claim, 3 Drawing Sheets

SYSTEMS AND METHODS FOR GENERATING PATTERN KEYS FOR USE IN NAVIGATION SYSTEMS TO PREDICT USER DESTINATIONS

TECHNICAL FIELD

Embodiments of the invention generally relate to automated navigational systems and, in particular, systems and methods for automatically generating pattern keys that may be used in automated navigation systems for fast and efficient prediction of user destinations.

BACKGROUND

In general, navigation systems are typically employed to assist travelers in determining travel routes and obtaining other useful travel information. For example, navigation systems may implement functions to calculate a travel route toward a desired end destination identified by a user starting from a given location as determined using Global Positioning System (GPS) technology. Navigation systems may further implement functions for predicting the location of a driver's destination while en route, and use the predicted to decide what information to automatically present to the driver depending on the predicted destination. In particular, conventional destination prediction techniques may involve capturing travel data in real-time during a journey, and using the captured data (along with other data/processes) to determine a current position of the vehicle and predict where the vehicle is heading. As the vehicle continues on the journey, the prediction process will repeat continually, predicting new destinations as unexpected decisions are made by the vehicle/driver. With such conventional prediction techniques, large amounts of information (including previous journey information) must be obtained and processed on the fly (i.e. during the journey) in order to predict a destination, which can be inefficient resulting in delayed or inaccurate prediction results.

SUMMARY OF THE INVENTION

Exemplary embodiments of the invention generally include systems and methods for automatically generating pattern keys that may be used in automated navigation systems for fast and efficient prediction of user destinations.

In one exemplary embodiment of the invention, a method is provided for automatically generating pattern keys for use by an automated navigation system to provide navigational assistance. The method includes obtaining route information regarding routes traveled by a user, wherein route information for a given route comprises a starting location, a destination location and one or more decision point locations along the route from the starting location to the destination location. The obtained route information is used to build an adaptive neural network in which the routes traveled by the user are represented in the neural network with corresponding starting and destination locations and one or more decision point locations between the starting and destination locations, wherein the decision point locations have associated weights that are adaptively learned using the obtained route information to represent user travel patterns.

The neural network is traversed to identify one or more predictable routes, wherein a predictable route is identified as a route through the adaptive neural network in which beginning from a starting location of the route, a destination location can be predicted with a probability that exceeds a threshold value, based on the weights associated with a subset of one or more decision point locations in a beginning portion of the route following the starting location.

A pattern key is then generated for each identified predictable route, wherein the pattern key includes the predicated destination location and the subset of one or more decision point locations between the starting point and predictable destination location. The pattern keys are then stored for subsequent access and use to support real-time navigational assistance functions, such as destination prediction.

These and other exemplary embodiments, features and advantages of the present invention will be described or become apparent from the following detailed description of exemplary embodiments, which is to be read in connection with the accompanying drawings.

DETAILED DESCRIPTION OF EXEMPLARY EMBODIMENTS

Exemplary systems and methods for automatically generating pattern keys that may be used in automated navigation systems for fast and efficient prediction of user destinations will now be discussed with reference to the exemplary illustrations of FIGS. 1, 2 and 3, for example. It is to be understood that the systems and methods described herein in accordance with the present invention may be implemented in various forms of hardware, software, firmware, special purpose processors, or a combination thereof. Preferably, the present invention is implemented in software as an application comprising program instructions that are tangibly embodied on one or more program storage devices (e.g., hard disk, magnetic floppy disk, RAM, CD ROM, DVD, ROM and flash memory), and executable by any device or machine comprising suitable architecture. It is to be further understood that because the constituent system modules and method steps depicted in the accompanying Figures can be implemented in software, the actual connections between the system components (or the flow of the process steps) may differ depending upon the manner in which the application is programmed. Given the teachings herein, one of ordinary skill in the related art will be able to contemplate these and similar implementations or configurations of the present invention.

Figure 1:
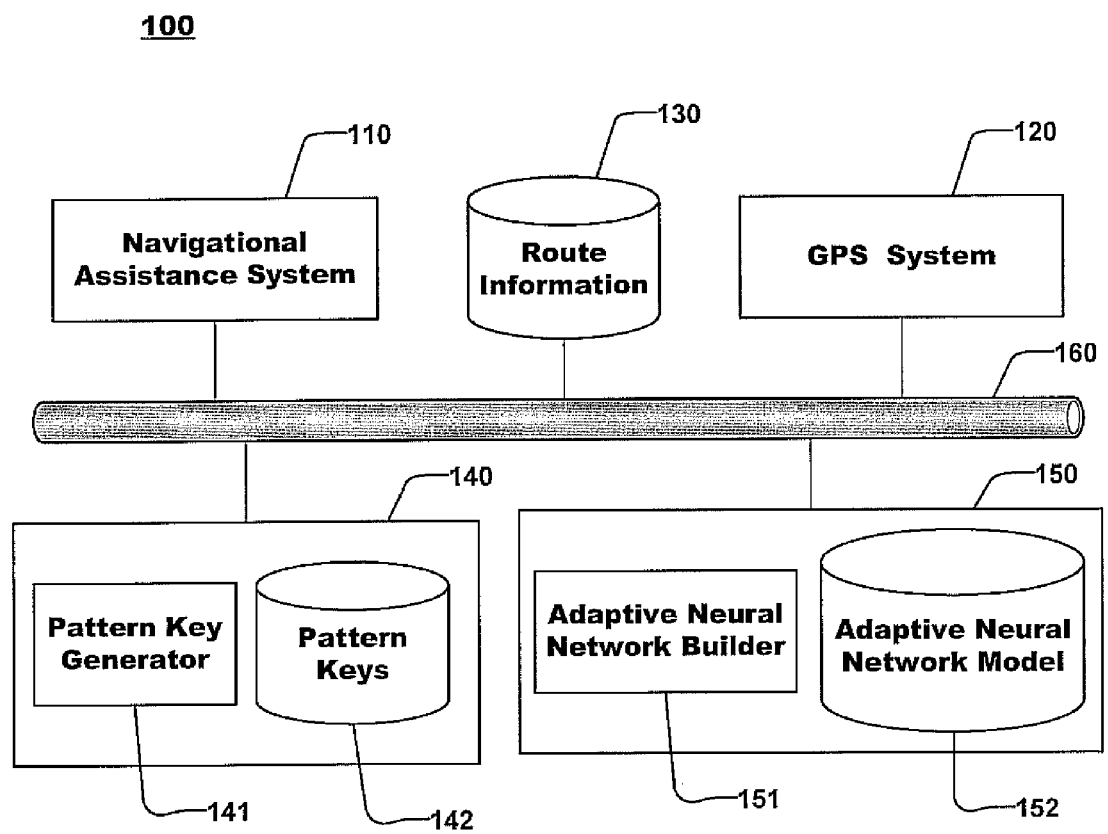
FIG. 1 is a high-level schematic block diagram of a navigational system according to an exemplary embodiment of the invention.

FIG. 1 is a high-level schematic block diagram of a navigational system (100) according to an exemplary embodiment of the invention. In general, the system (100) comprises a navigational assistance system (110), a UPS system (120), a data store (130) to store route information, a pattern key processing module (140) and neural network module (150), all of which are in communication over a communications system/bus (160). The GPS system (120) comprises a GPS receiver system and other electronic circuitry, components and constituent processing modules that are commonly employed in GPS systems to, e.g., determine position (latitude, longitude and altitude) at specific times and record position information in data store (130). The navigation assistance system (110) processes the captured route information in data store (130) using one or more known navigational assistance functions (e.g., route calculation, destination prediction, etc.) and other functions known in the art to support automated navigation applications.

The pattern key module (140) and the neural network module (150) implement functions according to exemplary embodiments of the invention to supported automated generation of pattern keys representing user travel routes based on a model of user travel behavior. In accordance with an exemplary embodiment of the invention a pattern key is a data structure that includes a start location, decision points and an end destination associated with a travel route, wherein the set of decision points for a given pattern key are selected to identify the user is traveling to a unique end destination along the corresponding route from the starting location. The system (100) uses GPS technology to monitor and store route information for every journey. This information is then used to generate pattern keys. Using an adaptive neural network of starting locations and decision points, probabilities for each end destination can be calculated. The route through the network with the highest probability becomes a pattern key.

More specifically, the pattern key module (140) comprises a pattern key generator (141) that generates pattern keys which are stored in data store (142). The neural network module (150) comprises a neural network builder module (151) to build/train an adaptive neural network (152) using route information captured by the GPS system (120) and recorded and stored in data store (130). As explained below, an adaptive neural network is trained using route information regard routes traveled by the user, wherein the travel routes are represented in the neural network with corresponding starting and destination locations and one or more decision point locations between the starting and destination locations. The decision point locations have associated weights that are adaptively learned using the obtained route information to represent user travel patterns. Using an adaptive neural network of starting locations and decision points, probabilities for each end destination can be calculated The pattern key generator (141) uses the neural network (152) to identify one or more routes through the network with the highest probability and generate corresponding pattern keys (142). As explained below, a method for generating pattern keys involves processing the captured data to build a model that learns a user's travel behavior, and using the model to identify predictable and then reduce these routes down to a subset of key decision points, thereby producing a pattern key. The route information for a given route from start to destination is represented by a pattern key, which includes a subset of decision points along with the destination FIG. 2 illustrates an exemplary neural network (20) of travelling patterns of a given user from a work location to various destination locations. The neural network (20) comprises a network representation of a plurality of travel routes (R1~R4) from a root node S representing a starting location, Work, to a plurality of end nodes, E1, E2, E3, E4, representing destination locations including Home, Gym, School, and Supermarket for respective routes R1, R2, R3 and R4. The neural network (20) further comprises a plurality of intermediate nodes (D1~D8) representing decision point locations along the various routes R1~R4 between the starting location S and destination locations E1~E4. The neural network (20) models user travel patterns/behavior using captured route information, wherein the network (20) includes some form of counter, frequency, probability and/or weighting parameters on the decision point locations nodes to show which travel routes that have been taken more often, or which direction a traveler has proceeded at decision points. The decision point locations have associated weights that are adaptively learned using the obtained route information to represent user travel patterns FIG. 3 is a high-level flow diagram of a method for automatically generating pattern keys for use in navigation systems according to an exemplary embodiment of the invention. FIG. 3 illustrates an exemplary mode of operation of the navigation system (100) of FIG. 1 with regard to generation of pattern keys. For purposes of illustration, the exemplary process of FIG. 3 will be discussed with reference to FIGS. 1 and 2. Initially, the system (100) captures and stores route information regarding travel routes actually taken by one or more users of the navigation system (step 30). The route information for a given route may comprise GPS coordinates of a starting location, a destination location and one or more decision point locations along the route from the starting location to the destination location, which are recorded and stored from previous travels of the user.

The captured route information is used to build an adaptive neural network (step 31) that represents travel patterns of the user as determined from the captured route information. As discussed above with reference to FIG. 2, the routes traveled by the user are represented in the neural network with corresponding starting and destination locations and one or more decision point locations between the starting and destination locations, wherein the decision point locations have associated weights that are adaptively learned using the obtained route information to represent user travel patterns.

When the navigation system (100) is first used and no route information is available, the neural network is empty as no journeys have been made. AS route information is captured, the captured information is used to adaptively train the neural network model to learn about travel patterns/behavior of the user. When a user begins a journey along a travel route, the starting location of the journey, which may be GPS co-ordinates or a stored favorite, is stored in the neural network. Thereafter, decision points are added. For example, once a journey has started, each time the GPS device directs the user along a give path or direction, such information is added to the neural network as a decision point. Decision points may include, for example, turning onto a new road, an exit of a roundabout, a motorway junction, etc. At the end of the journey after passing through a number of decision points the destination is reached. At this point, the current location is added to the neural network as an end destination.

As more route information is captured over time, neural network grows to include all the start locations, end destinations and the decision points that a user passes along a given route from a starting location to a destination location. As the user repeats these journeys, the network is updated to weight decision points according to how many times they have been passed through. Over time the routes most traveled will be more highly weighted and the network gives a more accurate representation of the user's traveling patterns.

Next, the neural network is used to identify routes for which there is a high likelihood of predicting destination early in the route (step 32). In particular, all of the captured data is processed, and routes (from a start point to an end point) where there is a high probability of predicting a destination early in the route are identified. This produces a number of routes, made up of a start, any number of decision points, and a destination. A pattern key is then generated for each identified route (step 23). A pattern key is a subset of the set containing the starting point, all of the decision points, and the destination.

In one exemplary embodiment of the invention, a pattern key can be generated as follows. A starting location is selected, and the neural network is used to traverse the most weighted decision points. Once a decision point is reached that has sufficient probability of reaching a unique destination the start location and decision points are stored as a pattern key for that end destination. In this embodiment, a pattern key will be generated that contains information that can be used to determine the end destination of the user at the earliest possible time along a give route.

An exemplary process for generating pattern key (step 33) will now be discussed with reference to the exemplary neural network of FIG. 2. In the neural network (20) of FIG. 2, to obtain a pattern key from starting location S (work) to the endpoint destination E1 (home) with 100% accuracy, a pattern key of (S, D1, D2, D3, E1) can be generated to represent the travel route, R1, from the starting location, Work through decision point locations, Turn Left onto road X—Right at roundabout x—Turn left at road y, to a destination location, Home.

In another exemplary embodiment, the accuracy levels could be altered to enable earlier prediction. For example, in the last example, if a 90% accuracy rate is sufficient, then a pattern key of (S, D1, E1) can be generated to represent the travel route, R1, from the starting location, Work, with a subset of decision point locations, Turn Left onto road X, to the destination location, Home. In this example, based on the weights of the decision points, after turning left onto the road (D1) there is a 90% chance that the user is travelling to home (E1). Therefore, in this example, the pattern key (S, D1, E1) allows for earlier prediction of the possible end destination E1 after only 1 decision point D1, with at least 90% accuracy, instead of the three decision points D1, D2 and D3, providing 100% accuracy.

Figure 2:
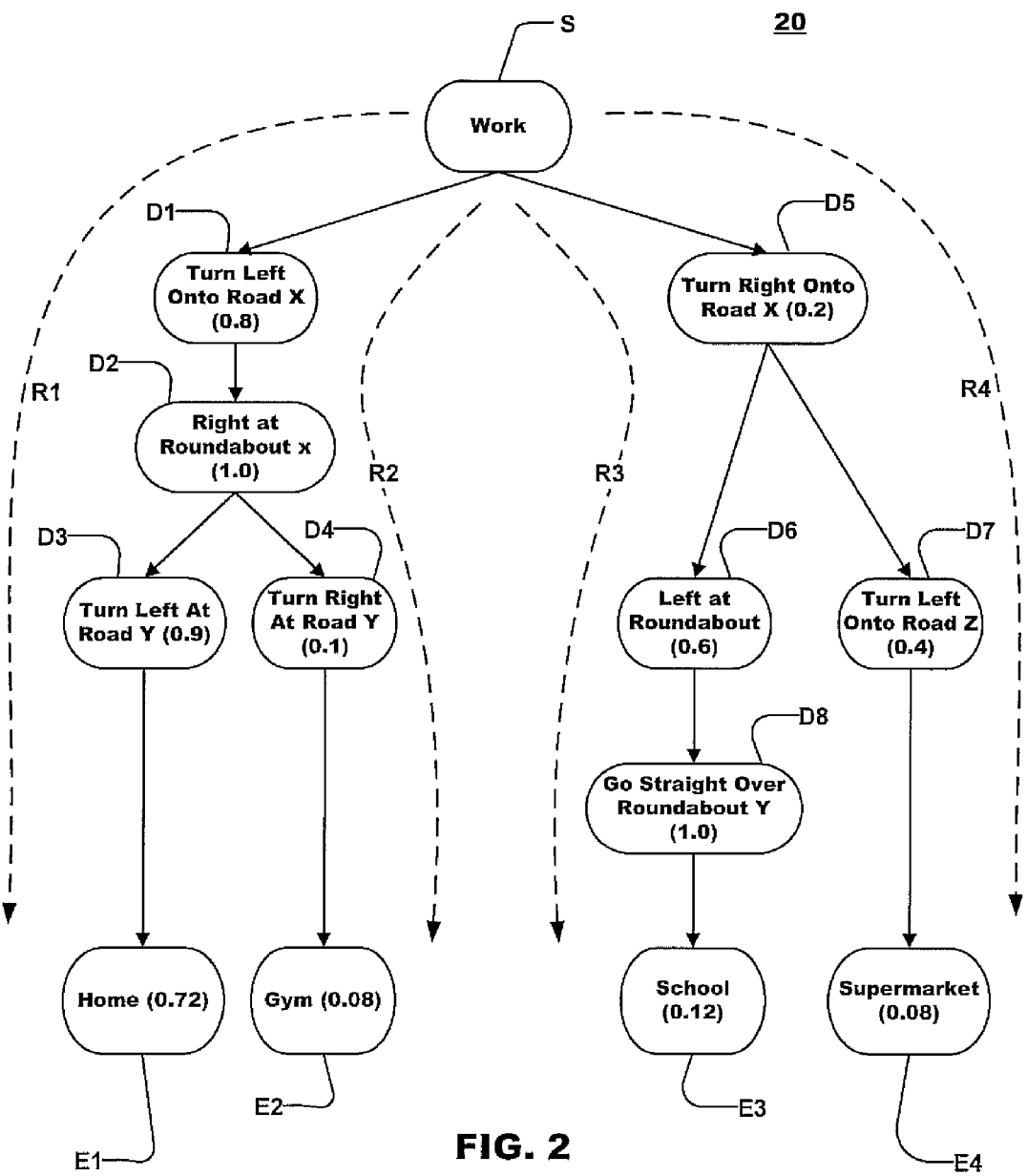
FIG. 2 illustrates an exemplary neural network representing travel patterns of a user along various routes, according to an exemplary embodiment of the invention.
Figure 3:
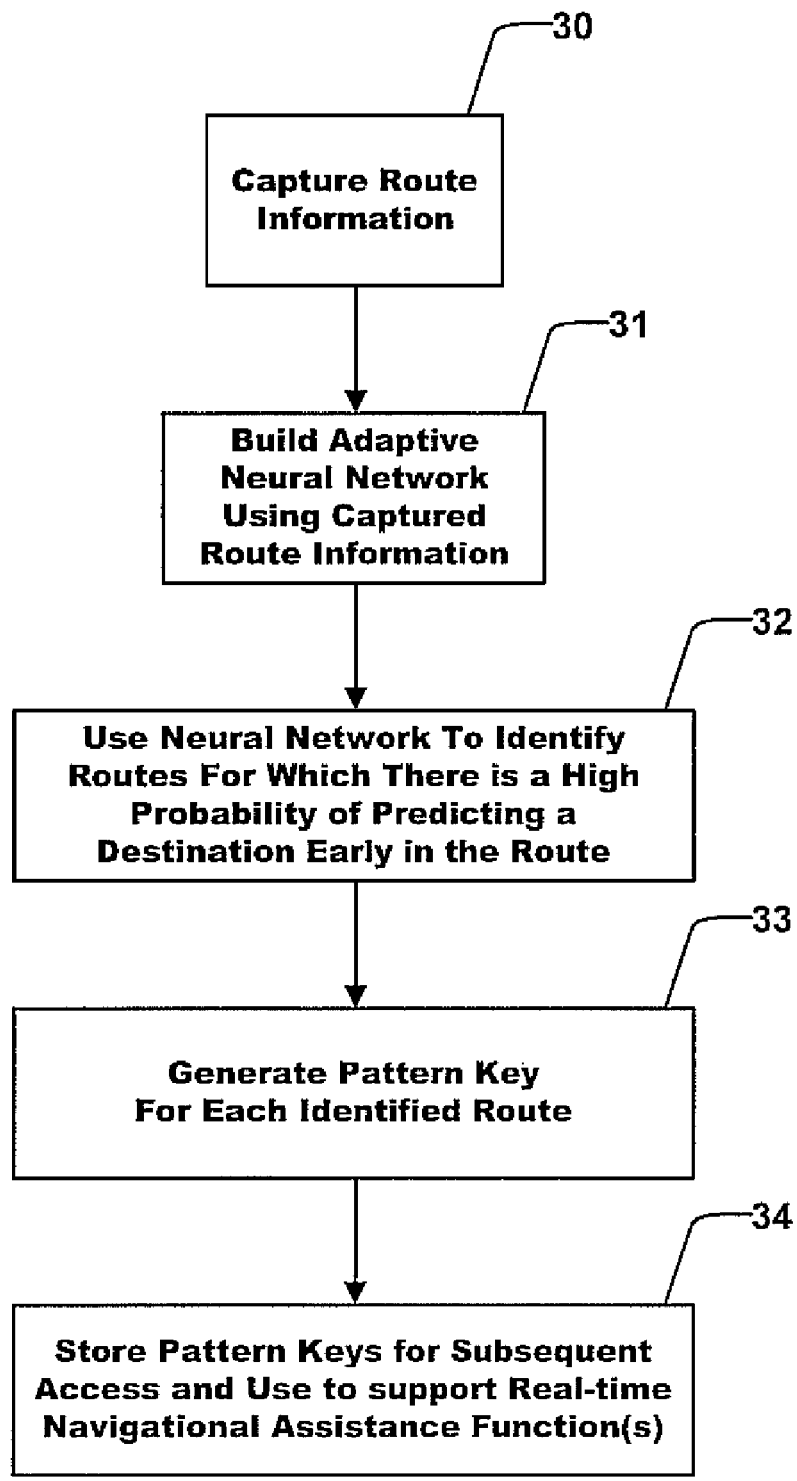
FIG. 3 is a high-level flow diagram of a method for automatically generating pattern keys for use in navigation systems, according to an exemplary embodiment of the invention.

Therefore, in certain exemplary embodiments of the invention, when generating pattern keys for given travel routes, a number of decision points could be removed if there is a high probability of the user traveling a given route (i.e. above some threshold value such as 90%) For example, for route R1 in the network (20) of FIG. 2, if is determined from captured route information that a user, upon reaching/passing certain roundabout (d2) (having in each case started from starting point S and passing through all the preceding decision points D1 and D2 in the route R1), the user has followed the path to D3 9 out of 10 times, and only once taken the other path to D4 after passing roundabout D2, the decision points D2 and D3 can be discarded and not used for generating pattern key of (S, D1, E1) for the route R1. Accordingly, a pattern key, which can be used to predict a destination as early as possible for a given route, can be generated by removing all remaining decision points in the sequence of decision points after the decision point at which it is determined that the probability of traveling to the destination location of the given route is above some threshold value (e.g., 80% of the time vehicles in the captured data have made it this far along this route, they have ended up going to our destination). It is to be understood that in other exemplary embodiments of the invention, the starting location does not have to be included in the pattern key.

Referring again to FIG. 3, as the captured data is processed and pattern keys are generated for predictable routes using a subset of key decision points, the pattern keys are stored for subsequent access and use to support real-time navigational assistance functions (step 34), such as destination prediction. By way of specific example, by generating pattern keys for predictable routes from start to destination locations based a subset of decision points, the pattern keys can be used predict a user's destination along a given travel route by matching the sequence of decision points for a given route to a user's actual travel path and predict the user's end destination if there is match between the pattern key and the actual path traveled.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for automatically generating pattern keys for use by an automated navigation system to provide navigational assistance, the method comprising:

obtaining route information regarding routes traveled by a user, wherein route information for a given route comprises a starting location, a destination location and one or more decision point locations along the route from the starting location to the destination location;

using the obtained route information to build an adaptive neural network in which the routes traveled by the user are represented in the neural network with corresponding starting and destination locations and one or more decision point locations between the starting and destination locations, wherein the decision point locations have associated weights that are adaptively learned using the obtained route information to represent user travel patterns;

traversing the adaptive neural network to identify one or more predictable routes, wherein a predictable route is identified as a route through the adaptive neural network in which beginning from a starting location of the route, a destination location can be predicted with a probability that exceeds a threshold value, based on the weights associated with a subset of one or more decision point locations in a beginning portion of the route following the starting location;

generating a pattern key for each identified predictable route, which comprises the destination location and the subset of one or more decision point locations sufficient to determine that the probability exceeds the threshold value with the remaining decision points in the sequence being omitted from the pattern key; and storing the pattern keys.

* * * * *